(12) United States Patent
Adeney

(10) Patent No.: US 8,041,028 B2
(45) Date of Patent: Oct. 18, 2011

(54) DOUBLE-TALK DETECTION

(75) Inventor: Kathryn Adeney, Dunrobin (CA)

(73) Assignee: Magor Communications Corporation, Ottawa, ON (CA)

( * ) Notice: Subject to any disclaimer, the term of this patent is extended or adjusted under 35 U.S.C. 154(b) by 598 days.

(21) Appl. No.: 12/232,843

(22) Filed: Sep. 25, 2008

(65) Prior Publication Data

US 2010/0074432 A1    Mar. 25, 2010

(51) Int. Cl.
*H04M 9/08* (2006.01)
(52) U.S. Cl. .................. 379/406.08; 370/286
(58) Field of Classification Search ............. 379/406.01, 379/406.04, 406.08; 370/286–292
See application file for complete search history.

(56) References Cited

U.S. PATENT DOCUMENTS

2002/0041678 A1* 4/2002 Basburg-Ertem et al. ................ 379/406.01

* cited by examiner

*Primary Examiner* — Walter F Briney, III
(74) *Attorney, Agent, or Firm* — Marks & Clerk; Richard J. Mitchell

(57) ABSTRACT

Within audio telecommunications for audio-visual conferencing a means of reliable double-talk detection is required for several reasons, including control of residual echo, and control of adaptive algorithms used to estimate the echo. Existing techniques tend to either fail when echo return loss is very low or require highly complex algorithms to increase the range of detecting whether double-talk is occurring. The invention is based upon a new method of estimating the power envelope of the double-talk signal. This estimation is then employed in conjunction with a slightly modified version of an echo return loss enhancement (ERLE) based statistic, to form a double-talk decision based on a combination of the two statistics. The resulting decision rule works for both low-ERLE and high-ERLE situations, which is useful when there can be large variations in the magnitude of the echo path seen by the algorithms, or where near-end noise prevents the achievement of high ERLE.

15 Claims, 3 Drawing Sheets

DOUBLE-TALK DETECTION

FIELD OF THE INVENTION

The present invention relates to telecommunications and, more particularly, to a system and method for detecting double-talk in voice communication.

BACKGROUND

In audio communication, there is a known problem of echo. Echo is particularly problematic when speakerphone functionality is used because voice data from both ends of a communication path is incident on a microphone at either end. To solve the echo problem, digital signal processing is used to subtract what is perceived by the digital signal processing to be echo related noise. To this end, converging processes have been designed to converge over time on an echoless or near echoless communication. As new processes have been designed, a time to converge and a quality of echoless communication have greatly improved.

Distinguishing echo signals from desired signals is often difficult due to double-talk situations. Double-talk occurs when two people, one on the receiving side of the network and one on the transmitting side of the network, speak simultaneously. The dual transmission and reception of signals disrupts echo canceller adaptation, and as a result, the echo canceller often performs poorly when a robust double-talk detector is not employed. When no double-talk exists, the echo canceller properly adapts its model of the echo signal path since the echo canceller only receives a signal that contains the echo. But during double-talk, the receiving side also transmits signals along a return signal path. Therefore, the echo canceller receives both return echo signals and signals transmitted from the receiving end simultaneously, and therefore may adapt improperly. Thus, a problem arises if the echo canceller erroneously adapts its model of the estimated echo signal according to a transmitted signal rather than according to an echo signal. The echo canceller may begin to distort transmitted signals.

Reliable double-talk detection is also important for echo cancellers that employ Non-Linear Processors (NLP) to improve echo canceller performance. In such architectures, a non-linear impediment is introduced in the transmit path when only the receive direction carries speech. This impediment is designed to remove residual echo (echo not cancelled by the adaptive filter), while passing the background noise from the transmitting end, or a reasonable-sounding imitation thereof. In many NLP implementations, it is necessary to turn off the NLP during double-talk, in order to allow transmitted (near-end) speech to pass unimpeded.

Reliable double-talk detection is required for various reasons, including control of residual echo, and control of adaptive algorithms used to estimate the echo. One existing technique for detecting double-talk uses changes in echo return loss enhancement (ERLE') to distinguish between when a near-end signal is residual echo and when a near end signal comprises near-end speech. Since the echo canceller filter is for reducing the echo—far end speech received at the near-end microphone and the far end speech is affected by the room impulse response, a value E1 is determinable such that $$E1 = S_{IN}/S_{OUT} \quad (1)$$

where $S_{IN}$ is the envelope (short-term average power) of an input signal provided from the microphone and $S_{OUT}$ is the envelope of an output signal provided from the echo canceller circuit. In theory, provided the echo canceller filter is reasonably well converged, then E1>1.0 (linear scale).

Obviously, in the absence of near-end speech, echo cancellation is easily evaluated. When the echo canceller has converged and there is no near-end speech, E1>>1.0, approaching infinity as noise approaches zero and the echo canceller filter approaches the RIR. This is a natural result of $S_{OUT}$ being in the denominator since when echo cancellation has converged without near-end speech $S_{OUT}$ should approach zero. As seen so far, E1 should be quite large when there is no double-talk and the echo canceller has converged.

As a result, double-talk may be determined to exist when the far-end is known to be active as determined by a voice activity detector, and hence:

$$E1 < E1_{Thresh} \quad (2)$$

where $E1_{Thresh}$ is a statistical value—either constant or pseudoconstant—which is established with respect to echo return loss enhancement (ERLE) by the relationship below in Equation 3.

$$ERLE' > E1_{Thresh} > 1.0 \quad (3)$$

where ERLE is an estimate of average ERLE' when there is no near-end speech, thereby making ERLE easy to evaluate. In actuality, ERLE' varies with the signal, i.e. the far-end speech. In order to address these changes in ERLE' either one of a long-term average, a minimum, or a recent estimate based on previous far-end speech without double-talk is often used to establish ERLE'. Many techniques for addressing changes in ERLE' are proposed in the prior art.

Thus, in such a system the selection of $E1_{Thresh}$ is essential to ensure that double-talk is correctly identified. For very large values of ERLE, there are large ranges of potential $E1_{Thresh}$ values. However, as ERLE decreases, then $E1_{Thresh}$ is restricted to a much narrower range which can be problematic. In practice, this situation arises when the uncancelled echo return loss (ERL) is high—since most adaptive algorithms only cancel echo to a degree that is limited by the near-end noise floor, and hence the achieved ERLE depends on how much echo there is to cancel in the first place. High echo return losses (without cancellation) are characteristic of systems in which speakers and microphone are spatially separated from each other.

One such prior art approach is the so-called "Geigel algorithm" presented by Duttweiler (see D. L. Duttweiler, "A Twelve-Channel Digital Echo Canceller," IEEE Trans. On Communications, Vol. COM-26, No. 5, pp. 647-653, May 1978). The Geigel algorithm presents a means to detect double talk, and compares the magnitude of the current sample of reference echo with a current value of the input signal. If the magnitude of the reference echo is least −6 dB higher than the input signal, then double-talk is determined to be present. The Geigel algorithm is simple and fast. However, when the magnitude of the reference echo is lower than −6 dB higher than the input signal during double talk, the Geigel algorithm fails to detect the double-talk. The Geigel algorithm is also sensitive to near-end noise interference.

Yet another method for detecting doubletalk is outlined in U.S. Pat. No. 6,944,288 (Seibert, "Double-talk and Path Change Detection using a Matrix of Correlation Coefficients", hereinafter Seibert). Seibert teaches a process of generating matrix coefficients using zero-lag auto-correlation and cross-correlations from signals commonly found within echo cancellers. From these double-talk and path changes are then detected using matrix operations such as determinants, eigendecompositions, or singular value decompositions. In a preferred embodiment, the determinant of the correlation-based matrix is compared against predetermined threshold values. Seibert whilst improving over the Geigel algorithm is a processor intensive approach using matrix calculations.

It would be advantageous to provide a straightforward and effective method of detecting doubletalk.

It would be advantageous to provide a voice communication system that provides robust and effective doubletalk detection even when ERLE and/or ERLE' has a low value—for example, for systems in which the ERL is high.

SUMMARY OF THE INVENTION

In accordance with an aspect of the invention there is provided a method comprising: providing a first signal from a local transducer; providing a second other signal from a remote transducer; determining based on the two signals a first indication of doubletalk based on echo return loss; determining based on the two signals a second indication of doubletalk based on other than echo return loss; and, using a combination of the first indication and the second indication to provide an output indication of doubletalk.

BRIEF DESCRIPTION OF THE DRAWINGS

Exemplary embodiments of the invention will now be described in conjunction with the following drawings, in which.

DETAILED DESCRIPTION OF INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
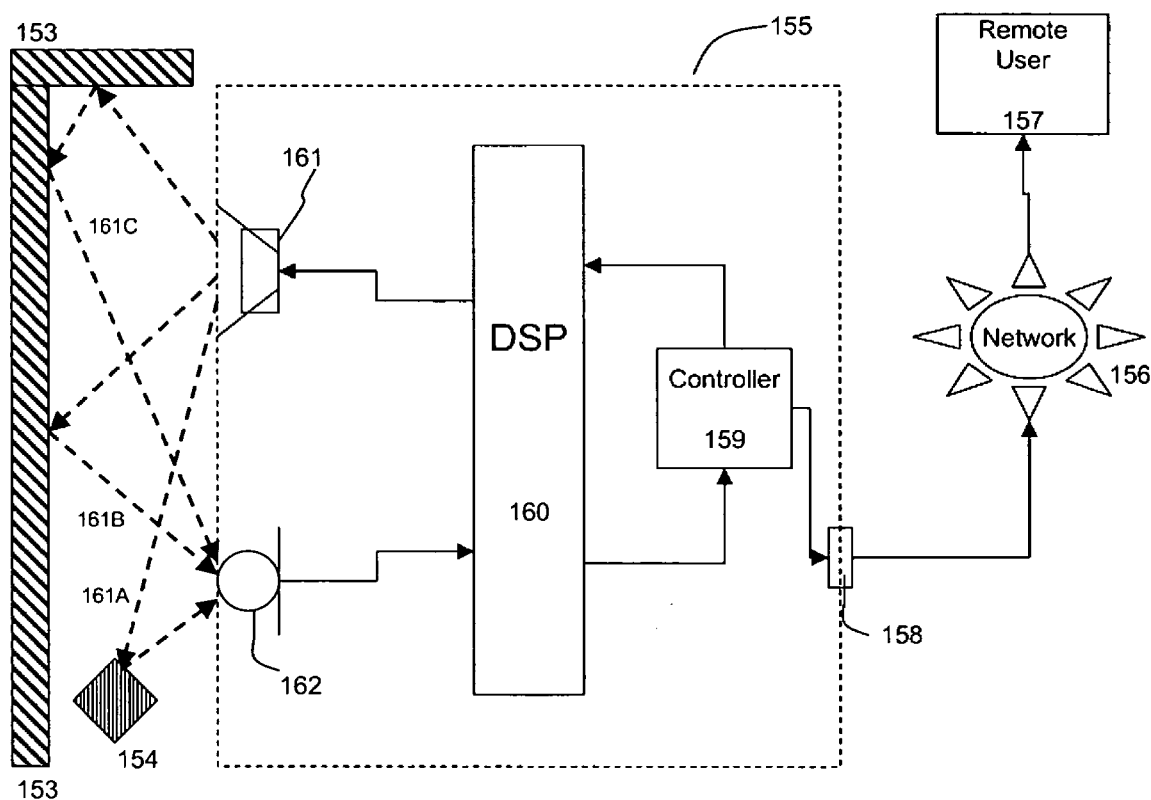
FIG. 1 depicts a typical environment and approach to echo cancellation for suppressing double-talk according to the prior.

Referring to FIG. 1, there is shown a simplified diagram depicting a typical environment and approach to echo cancellation for suppressing double-talk according to the prior art. Shown is an echo cancellation speakerphone 155 for use with network communication. A user (not shown) speaks in a room (not shown) comprising walls 153 and objects 154 and speakerphone 155 (not shown to scale) that is in communication via a network 156 to a second user system 157. Sound emitted by the loudspeaker 161 is not perfectly focused and, as shown at 161A, 161B, and 161C, traverses a plurality of paths before impinging on the microphone 162.

The speakerphone 155 is coupled to the network 156 via network interface 158. Electrically coupled to the network interface 158 is controller 159 which comprises a transceiver for providing an Rx signal to DSP circuit 160 and for transmitting a Tx signal via the network interface 158 and the network 156 to a destination system in the form of the remote user system 157. The Rx signal and the TX signal comprise data relating to an audio signal received from or for provision to the remote user system 157. The DSP circuit 160 is coupled to loudspeaker 161 and microphone 162. The DSP circuit 160 processes the Rx signal from the second user system 157 to provide to the loudspeaker 161 a loudspeaker signal and processes the signal from the microphone 162 to generate a Tx signal to be provided to the controller for transmission to the second user system 157. The DSP circuit 160 reduces an echo portion of the Tx signal based on the Rx signal and an echo cancellation process. When an adaptive echo cancellation process is used, the echo cancellation process converges over time to adjust for different room dynamics.

The invention is based upon a new method of estimating the power envelope of the near-end speech when far-end speech is present (e.g. the double-talk signal). This estimation is then employed in conjunction with a modified version of an ERLE-based statistic, to form a double-talk decision based on a combination of the two statistics. The resulting decision rule works for both low-ERLE and high-ERLE situations, which is useful when there can be large variations in the magnitude of the echo path as seen by the DSP circuit or where near-end noise prevents achievement of high ERLE. In order to outline the broader applicability of the decision rule outlined below are some underlying issues and potential solutions. Following this the circuit structure of the invention within an exemplary speakerphone is outlined.

The appropriate $E1_{Thresh}$ at which to declare double-talk varies depending upon the achieved ERLE, which depends in turn upon the near-end noise and the echo path loss (ERL) without echo cancellation. If ERLE>>1.0, then a larger threshold for $E1_{Thresh}$ gives a lower probability of error. In contrast if ERLE is close to 1.0, then the threshold $E1_{Thresh}$ is decreased in order to remain between 1.0 and ERLE giving rise to a higher probability of error. As ERLE approaches 1, this probability of error increases substantially.

This problem is addressed by calculating a new statistic E2, as defined below in respect of Equation (4):

$$E2=E1/ERLE \quad (4)$$

The decision on the presence of double-talk is then performed using Equation 5:

$$E2<E2_{Thresh} \quad (5)$$

E2 is optionally further normalized ($E2_{norm}$) by the near-end noise variance when E1 and ERLE are power measurements. E2 is optionally further normalized ($E2_{norm}$) by the near-end noise standard deviation when E1 and ERLE are amplitude measurements. Thus $E2_{norm}$ is based on some value relating to the noise $$E2_{norm}=E2/f(\text{Noise}) \quad (6)$$

Unfortunately, when there is high echo return loss (ERL) and near-end noise, the probability of error for any statistic based solely upon ERLE goes up, as the achieved ERLE is close to 0 dB and the change in ERLE between situations of double-talk and non-double-talk is small. Thus, in these situations, ERLE based statistics provide a high probability of error.

This problem is addressed by using an estimate of the double-talk envelope power, DT1:

$$DT1=S_{IN}-\text{Est}(\text{ECHO}_{IN}) \quad (7)$$

where $S_{IN}$ is the power envelope of the input signal and $\text{Est}(\text{ECHO}_{IN})$ is an estimate of the power envelope of the echo. In one embodiment, $\text{Est}(\text{ECHO}_{IN})$ may be computed as the power envelope of the far-end speech as it is played to the speaker $R_{OUT}$, delayed an appropriate amount to compensate for the direct echo path delay, and then divided by an estimate of total echo return loss (TEL) including the echo canceller. In a linear scale, this is ERL*ERLE. Thus one estimate of $ECHO_{in}$ is as follows:

$$\text{Est}(ECHO_{IN}) = R_{OUT}/(ERL*ERLE) \quad (8)$$

Alternatively an equivalently applicable estimate is to multiply $R_{OUT}$ by echo path gain and echo path gain reduction for example by using an overall estimate of combined echo path loss or gain including the automatic echo cancellation circuit (AEC). Furthermore, a more conservative approach is to estimate $ECHO_{in}$ by the (short-term) maximum or worst-case envelope of $ECHO_{in}$ as measured directly in the absence of near-end speech.

The estimate DT1 is optionally scaled by its variance, which is estimated by near-end noise power $N_{effpwr}$, giving:

$$DT2 = (S_{IN} - \text{Est}(ECHO_{IN}))/N_{effpwr} \quad (9)$$

Problematically, in some situations, ERLE based statistics such as E1 and E2 supra give a lowest probability of error, whereas in others, DT1 or DT2 work best. This problem is addressed for enhancements in accuracy and versatility by combining both DT-type and ERLE-type statistics into a single double-talk detector. An exemplary decision rule using a combination of these statistics is:

$$(DTx > DT_{Thresh}) \, \Im \, (Ex < Ex_{Thresh}) \quad (10)$$

where $\Im$ is a function applied therebetween, for example a logical AND function.

It has now been found that an ERLE-only based statistic provides reliable results when there is fairly low ERL and high ERLE. In contrast, the DT1 and DT2 statistics described herein above provide reliable results when there is higher ERL and lower ERLE. Thus, for situations with low ERL and high ERLE, the second condition within the function of equation 10 is most selective. In this case, it advantageous to use a higher value of $Ex_{Thresh}$, to decrease a number of missed double-talk instances; the first clause is used with a relatively low threshold as a course measure to decrease a probability of false detections.

For situations with high ERL and low ERLE, the thresholds are chosen such that the bulk of the double-talk detection is performed by the first condition, i.e. $DT_{Thresh}$ is much "tighter" than $Ex_{Thresh}$. The second clause acting, in this case, as "sanity check" to decrease a probability of false detections. Alternatively, a general form that addresses both situations is as follows:

Finally both statistics are optionally used in a decision rule of the form given below in respect of Equation 11:

$$f(DTx, Ex) > \text{CombThresh} \quad (11)$$

A more specific example of which is given in Equation 12:

$$(\alpha * DTx)/(\text{NoiseVar} * \beta * Ex) > \text{CombThresh} \quad (12)$$

In equation 13 is shown a more specific implementation of the equation 11:

$$((DTx > DTx_{Thresh}) \, \Im \, (Ex < Ex_{GatingThresh})) \| ((Ex < Ex_{Thresh}) \, \Im \, (DTx > DTx_{GatingThresh})) \quad (13)$$

α and β are estimatable using various techniques. In an embodiment, a simple artificial neural network using log (DTx) and log(Ex)) as inputs, and double-talk decision as output, is trained from recorded data; this would then yield log(α) and log(β) as input weights. This format has the advantage that by suitable choice of α and β, a wide range of echo paths and noise levels are accommodated with a threshold. Further, with a suitable neural network, determining these values is possible for varied situations such that a same system is widely deployable for varied conditions and varied double-talk detection applications.

Figure 2:
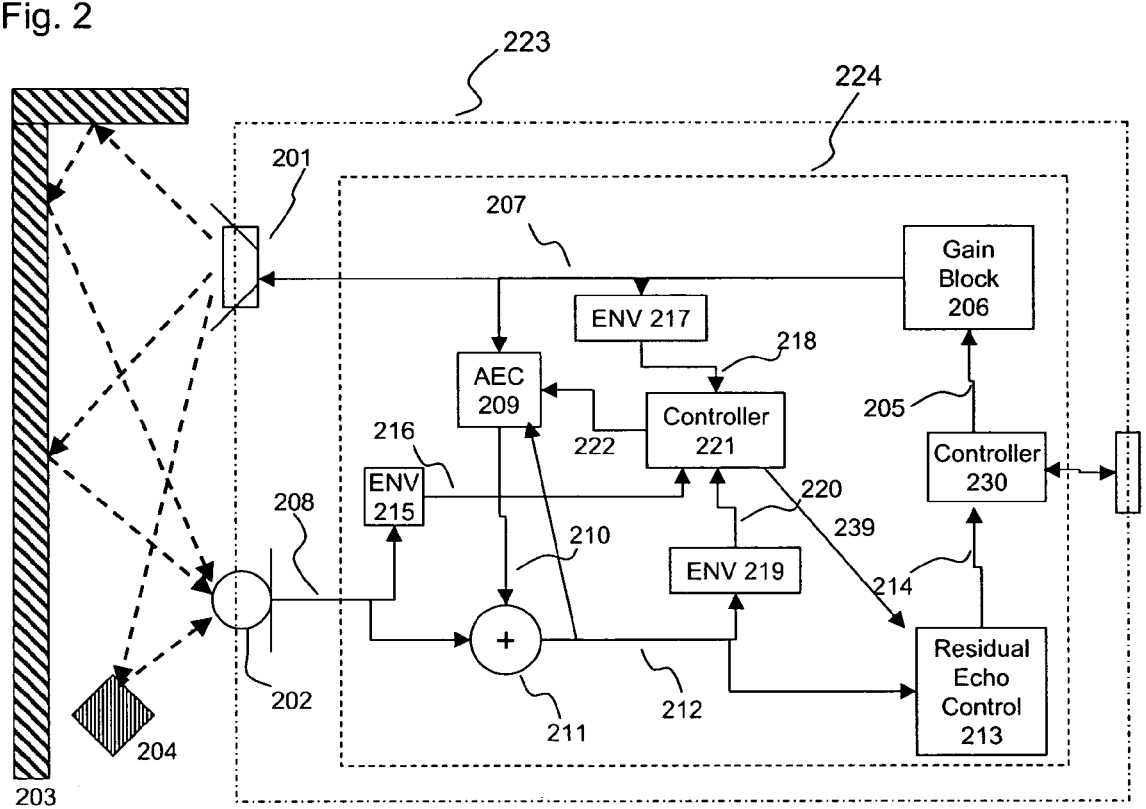
FIG. 2 depicts a simplified block diagram of an embodiment of the invention for determining double-talk and providing echo cancellation within a Full Duplex Speakerphone; and, FIG. 3 is a simplified flow diagram of an embodiment of the invention.

Referring to FIG. 2 there is depicted simplified block diagram of an embodiment of the invention for determining double-talk, within a system providing echo cancellation as applied to a Full Duplex Speakerphone. The simplified block diagram comprises a DSP 224 and a loudspeaker(s) 201 including digital to analog conversion and power amplification (both not shown for clarity) providing an audio representation of a digital audio stream 207. For example, the digital audio stream 207 and other digital audio streams are 44.1 kbps, 16 bit linear PCM digital signals. Alternatively, another digital audio stream format is employed. Further alternatively, a non digital audio signal is processed.

The loudspeaker 201 and microphone 202 are shown as physically separate devices arranged in room 203 including other acoustically reflective objects for example table 204 in addition to speakerphone users (not shown). Alternatively, the loudspeaker 201 and the microphone 202 are housed within a same housing such as for example is common for speakerphones, conference consoles, wireless handsets with hands free operation and so forth. Alternatively, multiple speakers are present. The acoustic signal from loudspeaker 201 follows many reflective paths before being picked up by microphone 202. Microphone(s) 202 including amplification, analog to digital conversion produces digital audio stream 208. Optionally, microphone 202 comprises an array of microphones and signal processing circuitry to produce a single microphone PCM signal 208.

Loudspeaker 201 is electrically coupled to gain block 206 which provides, for example, volume control. The signal received from a remote end of the communication link is provided to controller 230. Controller 230 passes the received signal (RX signal) to the gain block 206. Optionally, the gain block also provides filtering of the RX signal. Alternatively, the controller filters the RX signal. The RX signal 205 as shown is a digital signal. Optionally, the RX signal is analogue and an analogue to digital converter is used to transform it into the digital domain.

The digital audio stream 207 is provided to Acoustic Echo Canceller (AEC) 209, which is controlled in a manner known in the art by control signals 222 generated by controller 221. The resultant audio stream 210 output from the AEC 209 is added to microphone output signal 208, generated by microphone 202, in summation circuit 211. Once the AEC 209 is fully converged and there is no near end sound, signals 210 and 208 will be approximately in antiphase, then the resulting signal at the output summation signal 212 of the summation circuit 211 has nominally zero amplitude.

The output summation signal 212 is then coupled to the Residual Echo Circuit 213 which processes the output summation signal 212 to generate the speakerphone transmit signal 214. The output summation signal 212 is also fed back to AEC 209 for use in adapting the AEC. The speakerphone transmit signal 212 like Rx signal 205 is optionally encoded using PCM coding or an analog technique and is typically in the same format as the received signal. The residual echo control circuit 213 is controlled according to a control signal 239 from controller 221.

The DSP 224 further comprises third Envelope Detector 215, which computes the signal envelope $S_{IN}$. A first envelope detector 217 generates a first envelope signal 218 $R_{OUT}$, a positive value that is updated at a rate commensurate with the controller 221, for example every few milliseconds. $R_{OUT}$ represents the short-term average power of the digital audio stream 207, $Rx_{OUT}$. Similarly second envelope signal 220 $S_{OUT}$ generated by second Envelope Detector 219, again a positive value that is updated at a rate commensurate with the controller 221 represents the short-term average power of the output summation signal 212, $S_{OUT}$.

Figure 3:
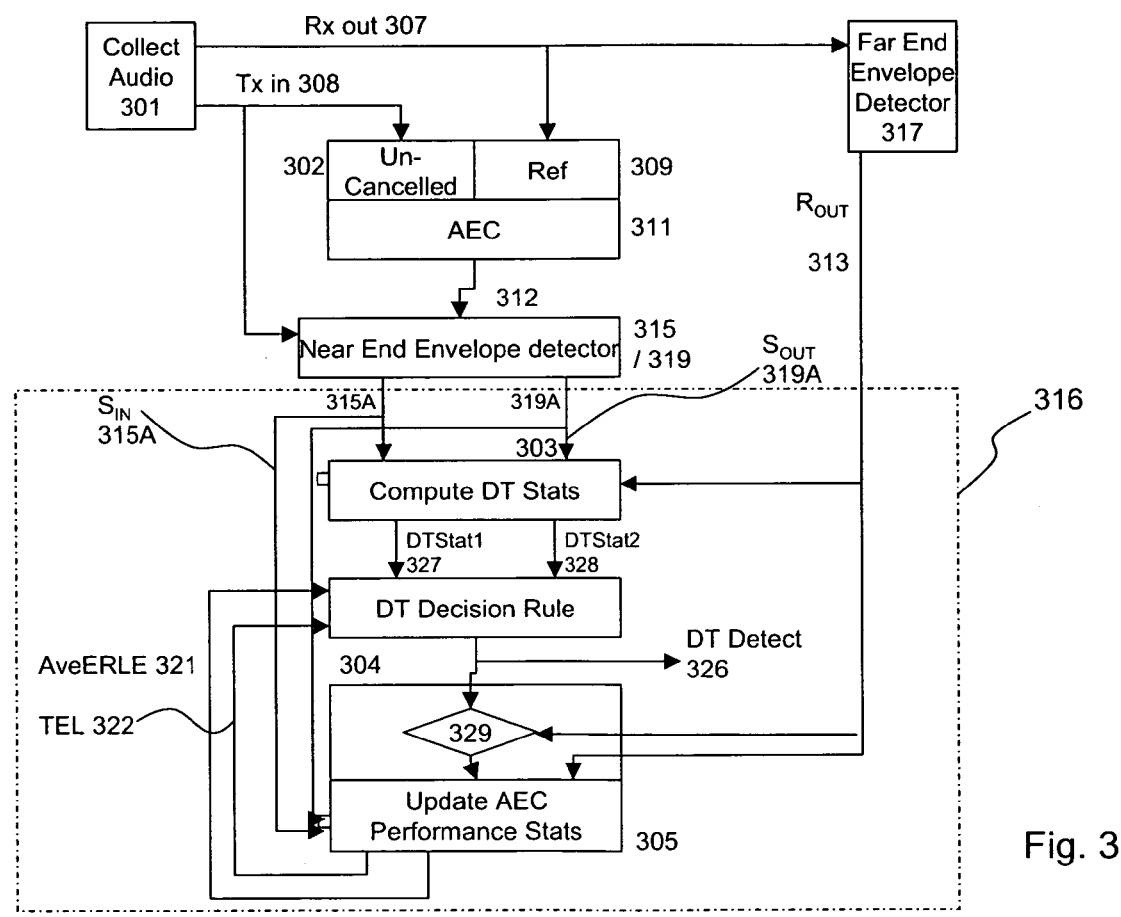

Controller 221 processes the above three signals—that is, first envelope signal 218, second envelope signal 220, and binary signal 216, in order to generate the AEC Control signal 222, for example according to FIG. 3.

Now referring to FIG. 3, a simplified flow diagram of an embodiment of the invention for generating AEC control signal 222 and residual echo control signal 239 is provided. At 301 audio signals are collected, being Tx in 308 and Rx out 307. Tx in 308 is provided to Un-Cancelled block 302 and to the Near End envelope detector blocks 315 and 319. Rx out 307 is provided to Far End envelope detector ENV 317 and also to Reference block Ref 309. Ref 309 and Un-Cancelled 302 are combined within AEC block 311 and employed to generate echo-cancelled audio 312 which is provided to the Near End envelope detector blocks 315 and 319.

The Near End ENV blocks 315 and 319 compute envelope signals for the uncancelled and echo-cancelled audio, labeled $S_{IN}$ 315A and $S_{OUT}$ 319A respectively. These are provided to a Compute DT Stats block 303. Signals 315A and 319A are also fed forward into Update AEC Performance Stats 305. Also fed into Compute DT Stats block 303 is $R_{OUT}$ 313.

Compute DT Stats block 303 generates DTStat1 327 and DTStat2 328, which are fed to DT Decision Rule block 304. DTStat1 is an ERLE-based statistic, for example E1 given by Eq. (1), E2 given by Eq. (4), or $E2_{norm}$ given by Eq. (6). DTStat2 is an estimated-doubletalk-based statistic given by, for example, DT1 (Eq. 7) or DT2 (Eq. 9). In the preferred embodiment, DTStat1=$E2_{norm}$, and DTStat2=DT2.

The DT Decision Rule block 304 undertakes the determination of whether double-talk is present, based upon DTStat1 327 and DTStat2 328. Total Echo Loss (TEL=ERLE*ERL) 322 and AveERLE 321 which are provided from the Update AEC Performance Stats block 305 may optionally be used in block 304, to select which form the decision rule should take. From the DT Decision Rule block 304 is provided DT Detect signal 326 a binary signal that is high when double-talk is detected. DT Detect also feeds forward to Decision Result block 329 which functions according to Equation 15 below:

Result of Decision Result block 329=(FE Active)
AND NOT (DT Detect)  (15)

The result of Decision Result block 329 is fed forward to Update AEC Performance Stats block 305, which receives $R_{OUT}$ 313 from the Far End ENV 317, $S_{IN}$ and $S_{OUT}$ from Near End envelope detectors 315 and 319. These are employed to generate the AveERLE 321 and TEL 322 described supra which are fed back to the DT Decision Rule block 304.

These blocks show in simplified form the DSP function for the controller 221 and accordingly generation of the AEC Control Signal 222 and NLP control signal 239.

The double-talk decision may be further conditioned on the presence of voice activity on both near-end and far-end signals. The presence of such dual activity alone is not sufficient to detect double-talk, since when only the far-end is active, echo alone may cause both near and far-end VADs (voice activity detectors) to go active. It is well understood in the art of echo cancellation how to implement voice activity detection.

Numerous other embodiments may be envisaged without departing from the spirit or scope of the invention.

What is claimed is:

1. A method comprising:
providing a first signal from a local transducer;
providing a second other signal received from a remote end of a communication path;
determining based on the first signal and the second signal a first indication of doubletalk based on echo return loss;
determining based on the first signal and the second signal a second indication of doubletalk based on other than echo return loss; and,
using a combination of the first indication and the second indication to provide an output indication of doubletalk.

2. A method according to claim 1 wherein the first indication and the second indication are formed by comparing a determined value to a threshold value.

3. A method according to claim 2 wherein the threshold values are adjusted in dependence upon a statistical analysis of the echo return loss.

4. A method according to claim 3 wherein the threshold values are adjusted such that when echo return loss is lower, dependence upon the second indication is increased.

5. A method according to claim 3 wherein the threshold values are adjusted such that when echo return loss is higher, dependence upon the first indication is increased.

6. A method according to claim 3 wherein the threshold values are adjusted such that when echo return loss is higher, dependence upon the second indication is decreased.

7. A method according to claim 3 wherein the threshold values are adjusted such that when echo return loss is lower, dependence upon the first indication is decreased.

8. A method according to claim 1 wherein:
doubletalk is determined when $E2<E2_{Thresh}$, wherein $E2=E1/ERLE$ and wherein $E1=S_{IN}/S_{OUT}$.

9. A method according to claim 8 wherein:
doubletalk is determined based on a value DT1 wherein $DT1=S_{IN}-Est(Echo_{IN})$ and wherein $Est(ECHO_{IN})=R_{OUT}/(ERL*ERLE)$.

10. A method according to claim 9 wherein DT1 is scaled by its variance.

11. A method according to claim 9 wherein double talk is determined based on the combined function such that $f(DTx, Ex)>CombThresh$.

12. A method according to claim 11 wherein the combined function is of the form $(\alpha*DTx)/(NoiseVar*\beta*Ex)>CombThresh$.

13. A method according to claim 12 wherein the combined function is $((DTx>DTx_{Thresh}) \Im (Ex<Ex_{GatingThresh})) \| ((Ex<Ex_{Thresh}) \Im (DTx>DTx_{GatingThresh}))$.

14. A method according to claim 9 wherein DT1 is scaled in accordance with $DT2=(S_{IN}-Est(ECHO_{IN}))/N_{effpwr}$.

15. A system for doubletalk detection comprising:
a receiver for receiving a first signal from a local transducer;
a receiver for receiving a second other signal from a remote transducer, and having already been processed;
a processor for determining based on the first signal and the second signal a first indication of doubletalk based on echo return loss and a second indication of doubletalk based on other than echo return loss and for using a combination of the first indication and the second indication to provide an output indication of doubletalk.

* * * * *